July 31, 1962 V. R. POWELL 3,046,664
APPARATUS FOR MEASURING WALL THICKNESS OF TUBULAR MEMBERS
Filed Feb. 29, 1960
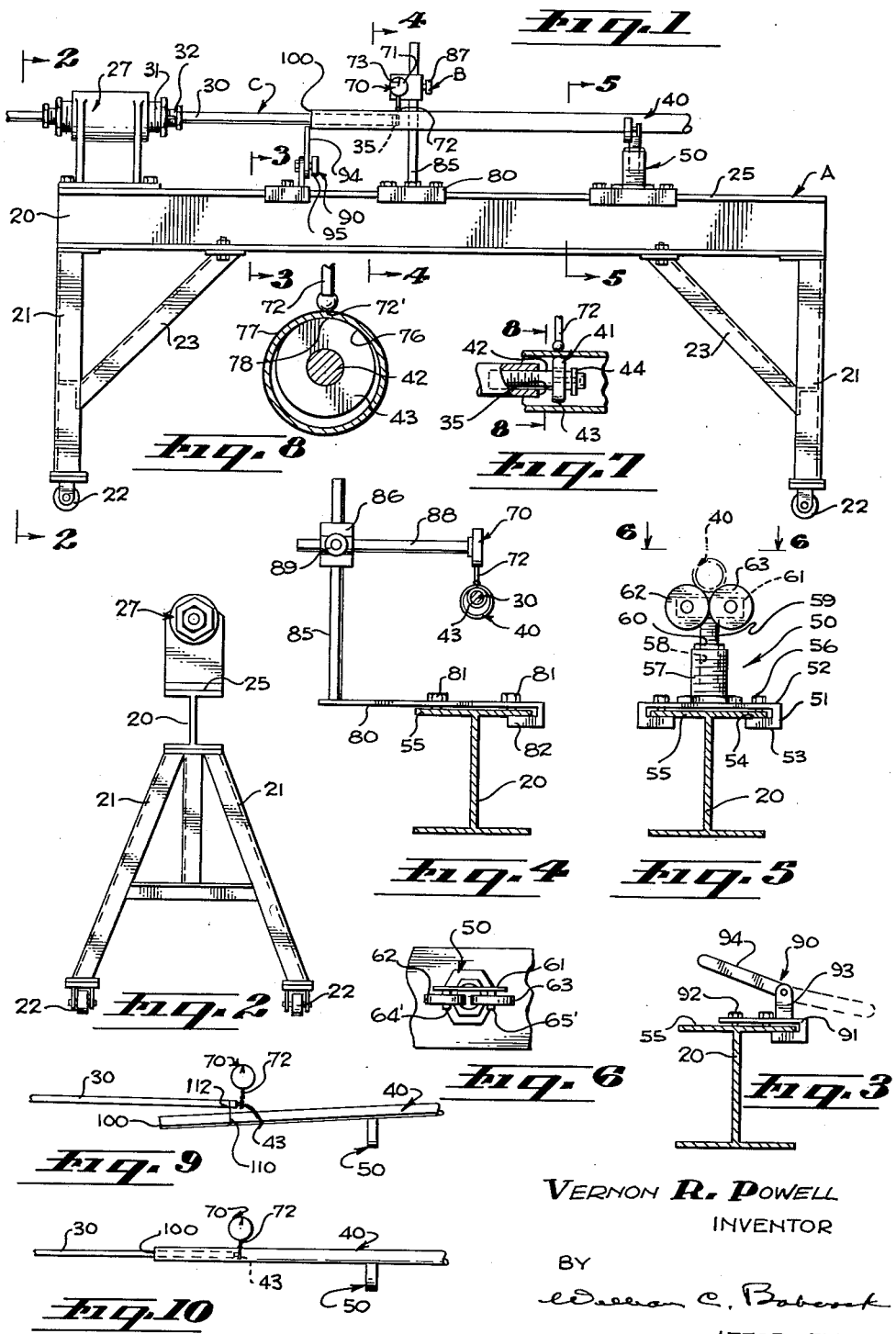
VERNON R. POWELL
INVENTOR
BY
ATTORNEY

United States Patent Office 3,046,664
Patented July 31, 1962

3,046,664
APPARATUS FOR MEASURING WALL THICKNESS
OF TUBULAR MEMBERS
Vernon R. Powell, 35 59th Place, Long Beach 3, Calif.
Filed Feb. 29, 1960, Ser. No. 11,669
5 Claims. (Cl. 33—147)

This invention relates to measuring apparatus and more particularly to an improved method and apparatus for measuring the wall thickness of tubular members.

In connection with various manufacturing processes it is desirable and sometimes essential that the wall thickness of tubular elongate members be accurately measurable. For example, in connection with tubular members formed for purposes wherein the wall thickness must be accurately controlled, it is frequently necessary to be able to accurately measure the wall thickness of the tubular member at various positions along its length and around its circumference. By means known to the prior art it has been difficult if not impossible to measure the wall thickness of an elongate body accurately at a position removed from the end thereof. That is, by known measuring techniques it has been necessary to measure the wall thickness of the elongate tubular member at its end, while there has been no economical and efficient method of measuring it at an intermediate point removed from its end, since it is not possible to insert measuring calipers or other measuring means itno the elongate member for any substantial distance.

Accordingly, it is an object of the present invention to provide a method and apparatus for measuring the wall thickness of tubular elongate members at various points along the length thereof.

It is another object of the present invention to provide an apparatus for measuring the wall thickness of elongate tubular members at points along the length thereof intermediate the ends of the member.

It is a further object of the present invention to measure the wall thickness of such elongate tubular members quickly and with a great degree of accuracy.

It is a still further object of the present invention to provide an apparatus for measuring the wall thickness of elognate members along a transverse section thereof.

Yet another object of the present invention is to provide such a wall thickness measuring apparatus which is simple and economical in use and which is simple and economical of manufacture.

The present invention comprises an apparatus having a planar base and means for supporting a mandrel parallel to said planar base with a measuring index at one end of said mandrel, said mandrel and measuring index being adapted to be inserted into an elongate tubular member. The measuring index is cooperatively associated with a linear measuring dial which is calibrated to a predetermined point of said measuring index. The measuring dial is zeroed at a radial point of the measuring index such that an elongate tube positioned thereon will displace the measuring dial through an accurately measurable distance.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

In the drawing:

FIGURE 1 is a view in elevation of the presently preferred embodiment of the present invention;

FIGURE 2 is an end view of the apparatus taken along line 2—2 of FIGURE 1;

FIGURE 3 is a partial view of the apparatus taken along line 3—3 of FIGURE 1;

FIGURE 4 is a partial view in elevation of the apparatus taken along line 4—4 of FIGURE 1;

FIGURE 5 is a view in elevation taken along line 5—5 of FIGURE 1;

FIGURE 6 is a partial plan view of the support means for the tubular member;

FIGURE 7 is a view in elevation and partly in section enlarged and showing in detail the measuring means of the present invention;

FIGURE 8 is a view in elevation taken along line 8—8 of FIGURE 7;

FIGURE 9 is a partially schematic view showing a step in the method of measuring in accordance with the present invention; and FIGURE 10 is a view corresponding to FIGURE 9 showing the second step in measuring the wall thickness of an illustrative tube in accordance with FIGURE 9.

Referring now to the drawings and particularly to FIGURES 1 and 2, the present invention includes a suitable support means A, a measuring means B and a calibrating means C. The support means in the presently preferred embodiment comprises an I-beam 20 supported at each end thereof upon suitable depending legs 21 which in turn are mounted upon casters 22 in order that the apparatus can be portable to some degree. In the embodiment shown the legs 21 are convergent toward the base of the I-beam and affixed thereto by suitable means such as by bolting. A brace 23 is positioned between the support legs 21 and the lower surface of the I-beam 20 in order to reinforce the support legs. The support legs 21 and braces 23 are similar at each end of the I-beam 20. The I-beam is sufficient in length to accommodate the length of the elongate tubular member to be measured, as will become more apparent hereinafter. The upper surface 25 of the I-beam 20 is such that it defines a planar surface upon which various members can be affixed in stationary or sliding engagement. Thus, the I-beam 20 provides a rigid planar surface 25 which serves as the support surface for the measuring and calibrating devices described hereinafter.

At one end of the support means 20 there is provided a holding means 27 adapted to support a mandrel 30 extending therefrom in a cantilevered position. That is, the holding means 27 is adapted to receive the mandrel 30 and is affixed to the upper surface 25 of the I-beam 20 such that the center line of the holder 27 is substantially parallel to the surface 25 and spaced thereabove. The holder 27 is of the type well known to the art which will accommodate a cylindrical mandrel extended therethrough and which is adapted to adjust the mandrel such that it may be positioned parallel to the support surface 25. Thus, in the embodiment shown the holder 27 includes a chuck 31 and an adjusting means 32 whereby the mandrel 30 can be inserted into the chuck and after being inserted can be adjusted to the position at which it is parallel to the planar surface 25 and also parallel to or in the same plane as the longitudinal center line of the surface 25. The holder 27 is of the type which allows the mandrel to extend therethrough such that the mandrel is longitudinally movable along the axis of the holder. Thus, as shown in FIGURE 1, the mandrel extends outward from both sides of the holder and the outer end 35 of the mandrel can be moved longitudinally to a desired position on the line parallel to and aligned with the surface 25.

The mandrel 30 is an elongate cylindrical member adapted to be received and positioned within the holder 27 as described hereinabove and having a predetermined outside diameter substantially less than the inside diameter of the elongate tubular member to be measured. The mandrel is sufficient in length that the outer end 35 thereof can be extended to any position along the length of the apparatus above the support surface 25. At the outer end of the mandrel there is provided a measuring index means 41 which includes a shaft threadedly mated with the mandrel and extending along the center line thereof. Thus, the shaft 42 is threaded into the outer end 35 of the mandrel and extends outward from the outer end along the longitudinal center line of the mandrel.

A circular indexing wheel 43 is rotatably mounted upon the shaft 42 at a point proximate the outer end 35 of the mandrel but spaced therefrom. The indexing wheel 43 is substantially transverse to the longitudinal axis of the shaft 42 and is retained on the shaft by suitable locking means such as a locking nut 44 at the outer end of the shaft. The indexing wheel 43 can be rotatably positioned upon the shaft in a longitudinally fixed position with respect thereto by any suitable bearing means known to the art. The indexing wheel 43 is circular in cross-sectional configuration with a diameter greater than the outside diameter of the mandrel but slightly less than the inside diameter of the elongate tubular member 40. The peripheral surface of the indexing wheel 43 is preferably chamfered or otherwise formed to provide a peripheral surface with a maximum outside diameter at one longitudinal position thereof. That is, in the embodiment shown the peripheral surface of the indexing wheel is formed with a convex cross-sectional configuration such that the mid-point longitudinally of the indexing wheel 43 has a greater outside diameter than the outside diameter of the wheel adjacent the opposite ends thereof.

Thus, as shown in FIGURE 7, when a tubular member is positioned upon the indexing wheel 43 as described more fully hereinafter, the internal surface of the elongate member will be in contact with the indexing wheel 43 at approximately the longitudinal mid-point thereof, and as shown in FIGURE 8 the internal surface of the tubular member will contact the circumferential line of the indexing wheel at a single point only. Therefore, by forming the indexing wheel with a smaller diameter than the inside diameter of the tubular member to be measured and with a longitudinally convex peripheral surface, substantially point contact is obtained between the indexing wheel and the internal surface of the tubular member. Both the mandrel 30 and the various components of the indexing means 41, including the indexing wheel 43, are formed of materials which are rigid and relatively incompressible.

Referring now particularly to FIGURES 1 and 5, a support means for the tubular member is provided which is slidably mounted upon the planar surface 25 of the support means A. The support member includes a base 51 which is slidably mateable with the upper flange of the I-beam 20 defining the planar surface 25. Thus, as shown in FIGURE 5, the base 51 includes an upper plate 52 with depending spaced-apart parallel flanges 53 at each end thereof which flanges have an upper surface 54 substantially parallel to the plate 52 and spaced therefrom by a distance in excess of the thickness of the flange 55 of the I-beam. Thus, the base 51 is slidably engaged with the flange 55 and can be locked into a predetermined position by turning the locking bolts 56 downward into contact with the upper surface of the flange 55 to lock the flange 55 between the upper surface of the flanges 53 and the fastening bolts 56. Thus, the base 51 can be slidably moved to any longitudinal position along the planar surface 25 and can be locked at the predetermined position by turning down the fastening bolts 56.

The tubular member support means 50, as shown in FIGURES 1, 5 and 6, also includes a vertically extending female riser 57 which is affixed to the plate 52 of the base 51 and extends vertically upward therefrom. The vertical riser 57 defines a cylindrical recess 58 into which a shaft 59 is telescopically mated for sliding vertical movement with respect to the vertical member 57 and the base 51. A lock nut 60 is positioned on the shaft 59. The shaft 59 is male threaded on the external surface and is mateable with the female threads of the lock nut 60, which lock nut is in turn in bearing contact with the upper surface of the vertical member 57. Thus, by rotating the nut 60 the shaft 57 can be moved upward or downward to a predetermined position. At the upper end of the shaft 59 there is positioned a horizontal crossmember 61 which extends outwardly from the center line of the shaft to form a T-support. First and second supporting rollers 62 and 63 are rotatably mounted upon the horizontal member 61 for rotation with respect thereto. The axes of rotation of the support rollers 62 and 63 are perpendicular to the cross-member and both are located in the same horizontal plane parallel to the base plate 52 and the planar surface 25. The support rollers 62 and 63 are of a predetermined radius as defined hereinafter and are spaced apart by a distance between the axes of rotation, which distance allows the rollers to be substantially juxtaposed. Thus, the rollers 62 and 63 are vertically oriented in side-by-side relationship and are rotatable about horizontal shafts 64' and 65'. Accordingly, as shown in FIGURES 1 and 6, the elongate member to be measured can be supported in rolling engagement upon and between the rollers such that the longitudinal axis of the tubular member 40 is along the plane of the longitudinal center line of the apparatus. In addition, by raising the support rollers the center line of the elongate member can be positioned coincident with the center line of the mandrel 30.

Thus, referring now to FIGURES 1, 5, 7 and 8, it can be seen that in utilizing the apparatus of the present invention a mandrel as previously described is mounted in the holder 27 and extends in cantilever fashion outward from the holder over the planar surface 25 in a position which is parallel to the surface 25 and aligned with the center line thereof. The distance by which the outer end 35 of the mandrel extends from the holder can be adjusted as described hereinbefore. The elongate tubular member 40, the walls of which are to be measured, is then positioned upon the rollers 62 and 63 of the support member 50, the longitudinal position of the support member 50 being adjustable along the length of the planar surface 25. As described hereinbefore, the height of the rollers 62 and 63 is adjusted such that, as shown in FIGURE 1, the elongate member can be telescoped over the outer end of the mandrel with the axis of the elongate tubular member 40 coinciding with the longitudinal axis of the mandrel. When the elongate member 40 is telescoped over the mandrel it will be supported by the indexing wheel 43 and will be in substantially point contact therewith, as previously described and as shown in FIGURES 7 and 8. Thus, both the mandrel 30 and the elongate tubular member 40 to be measured are substantially parallel to the planar surface 25 and are substantially aligned over a common longitudinal axis. By moving either the mandrel or the tubular member the longitudinal point along the length of the tubular member with which the indexing wheel 43 is in contact can be adjusted. That is, the elongate member 40 can be moved to the left in FIGURE 1 until it abuts the chuck 32 of the holder 27. Conversely, the mandrel 30 can be moved to the right in FIGURE 1 until the indexing wheel 43 is substantially at the right end of the apparatus. Thus, either one or both of the elongate tubular member and the mandrel can be moved longitudinally to adjust the relative position thereof in order to place the indexing wheel 43 at any point along the length of the elongate member 40.

Referring now to FIGURES 1 and 4, a measuring means such as a dial indicator of the type well known to the art is positoined upon the apparatus above the planar surface 25 thereof and at a point lying in the vertical plane of the longitudinal center line of the apparatus and of the mandrel and elongate member. That is, the type of measuring device utilized in the presently preferred embodiment is a dial indicator 70 of the type well known to the art which includes an indicating dial 71 and a plunger 72. Movement of the plunger 72 toward or away from the instrument causes a corresponding displacement of the hand 73 of the indicating dial which is calibrated to read the amount of movement of the plunger 72. Thus, the measuring plunger 72 is positioned with respect to the apparatus such that it is vertically oriented and as shown particularly in FIGURES 7 and 8, lies in the vertical plane extending through the center line of both the mandrel and the elongate tubular member being measured. This plane also includes the point 78 at which the internal wall 76 of the elongate member 40 is in contact with the circumference of the indexing wheel 43.

Accordingly, the measurement point 72' of the plunger 72 is in point contact with the outer surface 77 of the tubular member 40, which point lies on the radius extending from the center of the indexing wheel 43, which radius also passes through the point 78 at which the internal surface of the tubular member 40 is in contact with the indexing wheel 43. Thus, the distance between the measuring point 72' and the contact point 78 is the thickness of the wall at this point of its circumference. The measuring means 70 is oriented at this position, as shown in FIGURE 4, by affixing suitable mounting means such as the bracket 80 upon the upper surface of the I-beam 20. In the embodiment shown an L-shaped bracket is used with fastening bolts 81 which are adapted to affix the flange 82 in engagement with the flange 55 of the I-beam when the bolts 81 are turned down. Thus, the bracket 80 is slidably movable along the I-beam and can be affixed at any longitudinal position. The bracket extends transversely beyond the edge of the flange 55 and a vertical support 85 is affixed thereto extending vertically with respect to the planar surface 25. A bearing means 86 is slidably mounted upon the vertical member 85 for sliding movement with respect thereto and a lock ring 87 is connected through the bearing means 86 in contact with the vertical member. The lock ring is in threaded engagement with the bearing means 86 and in contact with the vertical member 85 such that upon rotation of the lock ring 87 the bearing means 86 is locked at the desired vertical position upon the member 85.

A similar horizontal bearing is provided through the bearing means 86 in order to slidably support a horizontal arm 88 extending therefrom. Manually operable locking means 89 such as the lock ring previously described is threadedly mated at the opposite side of the bearing means in engagement with the horizontal arm 88. Thus, the horizontal arm 88 is slidably movable along a horizontal axis and can be affixed in a predetermined position by turning down the lock ring 89. The measuring means 70 is affixed at the outer end of the horizontal arm 88 and is vertically oriented such that the plunger 72 is vertical. Thus, the position of the measuring means 70 can be varied vertically by raising the bearing means 86 along the member 85 and locking at the required position. Similarly, the measuring means can be varied horizontally by moving the arm 88 and locking it into position by means of the locking ring 89. In addition the longitudinal position of the measuring means can be varied by varying the position of the bracket upon the I-beam 20.

Thus, it can be seen that the measuring means 70 can be oriented to any required position in order to bring the measuring point 72' of the plunger 72 to the position lying along the radius extending from the center point of the indexing wheel 43 and extending through the contact point 78 between the internal surface of the elongate tubular member being measured and the indexing wheel 43.

As shown in FIGURES 1 and 3, an adjustable stop means 90 is slidably mounted upon the upper flange 55 of the I-beam 20 for longitudinal positioning along the length of the planar surface 25. The stop means includes a support bracket 91 similar to that previously described in connection with the bracket 80. The bracket 91 can be moved to a predetermined position on the flange 55 of the I-beam 20 and affixed in such position by tightening the bolts 92 extending through the upper portion of the bracket 91. An upstanding arm 93 is affixed to the upper surface of the bracket 91 and a stop arm 94 is pivotally connected thereto such that it can be pivoted substantially in a vertical plane transverse to the planar surface 25 and locked into the required pivoted position by means of a manually operable locking ring 95 (FIGURE 1). Thus, the stop means 90 can be longitudinally moved to a required position along the planar surface 25 between the holder 27 and the measuring means support bracket 80. The pivot arm 94 can be pivoted to a position at which it is in substantial contact with the mandrel 30 and locked in such position to form a stop which will bear against the end 100 of the elongate tubular member 40. Thus, the stop member 90 furnishes a means for returning the elongate member to a predetermined longitudinal position with respect to the apparatus in that the stop member 90 can be fixed upon the planar surface 25 and the elongate member can slide over the mandrel 30 till it contacts the stop arm 94. The outer end 100 of the elongate tubular member 40 can thereby be returned to the same longitudinal position with respect to the apparatus after it has been removed from the apparatus or moved with respect thereto.

Referring now to the figures including FIGURES 9 and 10, the operation of the apparatus of the present invention has in part been described hereinabove in connection with the mounting of the elongate tubular member 40 to be measured and with respect to the operation of the measuring device 70. However, to summarize the complete operation of the apparatus it should be noted, with reference to FIGURE 9, that regardless of the rigidity of the mandrel 30, since it is a cantilevered mandrel a weight positioned at the end thereof will cause some deflection, and such deflection may be sufficient to negative the accuracy required of the measuring apparatus of this invention. Accordingly, such deflection is compensated for in calibrating the measuring device 70. The amount of such deflection will of course be dependent upon the weight of the elongate tubular member 40 to be measured and the point along the length of the member 40 at which the thickness of the wall is to be measured.

Thus, as shown in FIGURE 9, if it is desired to obtain the measurement of the wall thickness of an illustrative tubular member 40 at a point along its length designated as 110, the measuring apparatus is first calibrated by positioning the tubular member 40 upon the rollers 62 and 63 forming the support means 50. The member 40 is then adjusted longitudinally and a hanger 112 is placed over the mandrel 30 and beneath the member 40 at the position 110. The elongate tubular member 40 is then allowed to rest upon the support member 50 and the hanger 112. This will cause the mandrel 30 to be deflected downward. The measuring device 70 is then calibrated by allowing the plunger 72 to descend until the measuring point 72' rests upon the point 78 of the indexing wheel 43. At this position of the plunger and measuring point 72' the indicator dial is set at zero or its reading is noted. The elongate tubular member is then properly positioned in the apparatus by supporting it upon the rollers 62 and 63 and at the proper stop position as shown by the stop arm 94. At this position the point 110 along the length of the mandrel will rest upon the indexing wheel 43. The plunger 72 of the measuring means 70 will then be raised away from the zero point 78 by a distance corresponding to the thickness of the wall of the tubular member at this position along its length. The elongate tubular member 40 is then rotated about the indexing wheel 43 and upon the support rollers 62 and 63 and readings of the wall thickness can be taken along its complete circumference. Thus, deviations in the wall thickness of the member at a particular transverse cross section thereof can be quickly and easily read directly from the measuring dial 71 of the measuring means. The same measurements can be made at any point along the length of the tubular elongate member 40 by positioning the indexing wheel 43 and measuring means 70 at the desired location along the length of the member 40. It should be noted that even though the tubular member is measured at a point along its length other than the point at which the calibration was made, an accurate measurement of the circumferential variation in wall thickness will be obtained. At the calibrated position, of course, a true and accurate measurement of the actual wall thickness as well as variations and deviations therein is obtained.

Thus the present invention provides an improved apparatus for quickly and accurately determining the wall thickness of a tubular body at any required position along its length.

What is claimed is:

1. An apparatus for use in measuring the true wall thickness of a circumferentially extending segment of a tubular member at any desired longitudinal position thereon, comprising: an elongate base; an elongate rigid mandrel disposed above said base; first means mounted on said base for adjustably supporting said mandrel above said base and parallel thereto; a transversely positioned index wheel rotatably supported from an end of said mandrel, said wheel being of greater transverse cross section than that of said mandrel but of lesser transverse cross section than that of the bore of said tubular member; second means mounted on said base for rotatably supporting an intermediate portion of said tubular member when a part of said tubular member extends over said mandrel and has the interior surface thereof in contact with said wheel; third means positioned externally of said tubular member when said tubular member is supported on said wheel and second means for measuring variations in the wall thickness of said tubular member, said third means including a movable element in contact with the external surface of said tubular member and an indicating element operatively associated with said movable element to indicate the amount of movement thereof, said movable element and indicating element being calibrated with respect to said wheel to measure the thickness of the portion of the wall of said tubular member situated therebetween when said first means is adjusted to dispose said mandrel in a position where said tubular member is horizontal; and fourth means for limiting the movement of said tubular member toward said first means to a position where said circumferentially extending segment of said tubular member is transversely aligned with said movable element.

2. An apparatus as defined in claim 1 wherein said first means comprises a support affixed to an end portion of said base, a chuck affixed to said support, which chuck engages and supports an end portion of said mandrel opposite the end thereof on which said wheel is supported, with means on said chuck for moving said supported mandrel to a position where said wheel and second means hold said tubular member in a horizontal position.

3. An apparatus as defined in claim 1 wherein said second means comprises two laterally spaced rollers on which said intermediate portion of said tubular member rests, and vertically adjustable means extending upwardly from said base for rotatably supporting said rollers at a desired elevation relative thereto.

4. An apparatus as defined in claim 3 wherein said vertically adjustable means are also longitudinally adjustable on said base.

5. An apparatus as defined in claim 3 wherein said fourth means comprises an upright affixed to said base, a stop arm, and means for adjustably supporting said stop arm on said upright, with said arm when adjusted to an upwardly extending position in which the upper end thereof is adjacent said mandrel preventing further longitudinal movement of said tubular member on said mandrel toward said first means.

References Cited in the file of this patent
UNITED STATES PATENTS

| | | |
|---|---|---|
| 1,356,214 | Metzger | Oct. 19, 1920 |
| 2,689,407 | Beyer | Sept. 21, 1954 |

FOREIGN PATENTS

| | | |
|---|---|---|
| 538,866 | Germany | Nov. 26, 1931 |